United States Patent Office 2,836,594
Patented May 27, 1958

2,836,594

PIPERAZINE DERIVATIVES AND PROCESS FOR PRODUCING THE SAME

Robert F. Parcell, St. Clair Shores, Mich., assignor to Parke, Davis & Company, Detroit, Mich., a corporation of Michigan No Drawing. Application June 29, 1955
Serial No. 518,999

9 Claims. (Cl. 260—268)

This invention relates to substituted alkanols and to methods for obtaining the same. More particularly, the invention relates to 4-(o-hydrocarbonylmercaptophenyl)-1-piperazine alkanols and acid addition salts thereof. These compounds, in their free base form, have the formula,

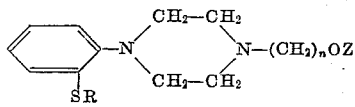

where R is an allyl group or an alkyl group containing not more than four carbon atoms, Z is hydrogen or a lower aliphatic carboxylic acid acyl group and $n$ is an integer from 3 to 6 inclusive. The free base compounds of the invention form well defined acid addition salts upon reaction with mineral acids such as hydrochloric, hydrobromic, sulfuric, phosphoric, hydriodic and the like acids.

In accordance with the invention 4-(o-hydrocarbonylmercaptophenyl)-1-piperazine alkanols having the above formula can be produced in a number of different ways. One general method for preparing these compounds involves reacting an N-phenylpiperazine of formula

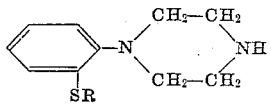

with an ω-haloalkanol of formula $$\text{Hal}—(CH_2)_n OZ$$

where Hal is a halogen atom and R, Z and $n$ have the same significance as given above. In carrying out the process it is preferable to employ about two equivalents of the N-phenylpiperazine to each equivalent of ω-haloalkanol and to use an anhydrous organic solvent such as benzene, toluene, xylene and the like; low boiling alcohols such as methanol, ethanol, isopropanol, isobutanol and the like, and low boiling ketones such as acetone, methyl ethyl ketone and the like. The temperature of the reaction is not particularly critical and can be varied in the range from room temperature to about 175° C. Preferably, the reaction is carried out at the reflux temperature of the reaction mixture.

The 4-(o-hydrocarbonylmercaptophenyl)-1-piperazine alkanols of the invention in which Z is hydrogen, can be converted to the corresponding 4-(o-hydrocarbonylmercaptophenyl)-1-piperazine alkanol esters by acylation. In carrying out the reaction in acylating agent such as an acyl halide or anhydride is employed in an inert anhydrous organic solvent such as an aliphatic ketone, aliphatic ether, benzene, toluene, dioxane and the like. In a case where acetic anhydride is employed as an acylating agent, acetic acid can be advantageously employed as a solvent. The temperature of the reaction is not particularly critical and can be varied over a considerable range. Temperatures in the range from 0 to 150° C. are ordinarily satisfactory. Preferably, the reaction is carried out at the reflux temperature of the reaction mixture. The relative quantities of the reactants can be varied with wide limits. However, for reasons of economy as well as ease of purification of the product, an excess of the acylating agent is generally employed.

The 4-(o-hydrocarbonylmercaptophenyl)-1-piperazine alkanol esters of the invention can be converted by hydrolysis or alcoholysis to the corresponding 4-(o-alkylmercaptophenyl)-1-piperazine alkanols. Hydrolysis is conveniently carried out with an aqueous alkali or alkaline earth metal hydroxide in an organic solvent such as a lower aliphatic alcohol or lower aliphatic ketone. Alcoholysis may be carried out with catalytic amounts of an alkali metal alcoholate in an anhydrous organic solvent such as a lower aliphatic alcohol. Alcoholysis or hydrolysis, as the case may be, can be effected over a wide temperature range but is preferably carried out at the boiling point of the reaction mixture.

Another method for the preparation of the compounds of the invention involves reducing a 4-phenyl-1-carbalkoxypiperazine of formula

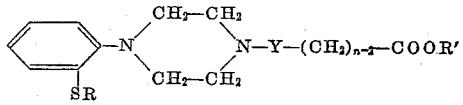

where R' is an alkyl group containing not more than four carbon atoms, Y is a —CH$_2$— or —CO— group, and R and $n$ have the same significance as given above. Reduction of the 4-phenyl-1-carbalkoxypiperazines having the formula can be carried out in accordance with the invention by chemical means employing metallic sodium and an alcohol or a complex oxidizable metal hydride such as lithium aluminum hydride. Reduction with a complex oxidizable metal hydride is preferred in the case where Y in the starting material 4-phenyl-1-carbalkoxypiperazine represents a —CO— group.

Reduction with lithium aluminum hydride is accomplished in an anhydrous non-hydroxylic organic solvent. Some examples of suitable solvents are diethyl ether, di-isopropyl ether, di-butyl ether, dioxane, tetrahydrofurane, ethylene glycol dimethyl ether and N-ethylmorpholine. Preferably, lithium aluminum hydride is employed in excess of the theoretical amount required. Best results are obtained by combining the reactants slowly. The temperature during the reduction is not particularly critical, the optimum temperature being in the range of about 15 to 35° C. Reduction with sodium metal in the presence of alcohol is accomplished preferably at a temperature below 100° C. Some examples of suitable alcohols are methanol, ethanol, n-propanol, isopropanol, n-butanol and the like. For best results sodium is employed in excess of the theoretical amount required. The 4-(o-hydrocarbonylmercaptophenyl)-1-piperazine alkanols produced by this method can be converted to the corresponding esters by acylation in the manner indicated hereinabove.

The 4-phenyl-1-carbalkoxypiperazines having the formula

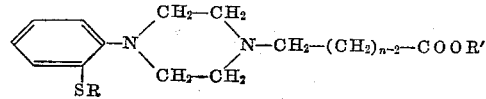

can be prepared conveniently by reacting an N-phenylpiperazine having the formula

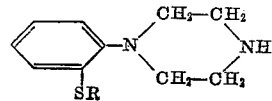

with (1) an ω-haloalkyl nitrile having the formula

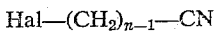

followed by treatment of the piperazinealkane nitrile so produced with anhydrous alcoholic hydroholic acid in the cold to produce the corresponding imine ester hydrohalide, and hydrolysis of the latter, or (2) an ω-haloalkanoic ester having the formula

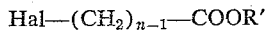

or, in the case where $n$ is 3, (3) an acrylic acid ester having the formula

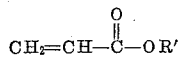

where R, R', $n$ and Hal have the same significance as given above. In the production of the 4-phenyl-1-carbalkoxypiperazines starting from the ω-haloalkyl nitriles and N-phenylpiperazines, the first step is accomplished in the same manner as is described above for the reaction of N-phenylpiperazine and ω-haloalkanol. The resulting 4-phenyl-1-piperazinealkanenitrile is treated in the cold, preferably at a temperature in the range of about 0 to 20° C., with at least one equivalent of a hydrohalic acid under anhydrous conditions in the presence of a lower aliphatic alcohol. The imino ester hydrochloride which is produced is then hydrolyzed, preferably in situ, by heating the reaction mixture, preferably at reflux temperature, in the presence of one equivalent of water. Production of the 4-phenyl-1-carbalkoxypiperazines starting from the ω-haloalkanoic ester and N-phenylpiperazine is accomplished in the same manner as is described above for the reaction of N-phenylpiperazine and ω-haloalkanol. Production of the 4-phenyl-1-carbalkoxypiperazines starting from acrylic acid ester and N-phenylpiperazine is accomplished in the same manner as is described above for the reaction of N-phenylpiperazine and ω-haloalkanol, preferably at room temperature employing an excess of the esters. The 4-phenyl-1-carbalkoxypiperazines having the formula

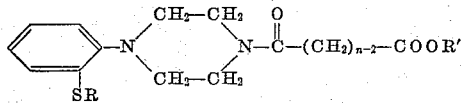

can be prepared by reacting an N-phenylpiperazine of formula

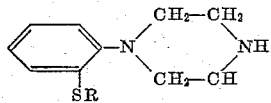

with a dicarboxylic acid derivative of formula

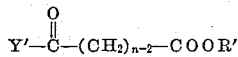

in the same manner as is described above for the reaction of α-haloalkanol with N-phenylpiperazine, where Y' is a halogen atom or an alkoxy group containing not more than four carbon atoms and R, R' and $n$ have the same significance as given above.

A special method for the preparation of the 4-(o-hydrocarbonylmercaptophenyl)-1-piperazine propanols comprises reacting an N-phenylpiperazine of formula

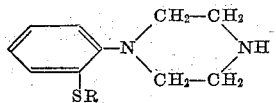

with allyl alcohol in the presence of an alkali metal alcoholate of allyl alcohol; where R has the same significance as given above. The temperature of the reaction is not critical and can be varied over a wide range. Temperatures in the range from 75 to 150° C. are satisfactory, particularly reflux temperatures. For best results, the reaction is carried out in the absence of any solvent other than allyl alcohol. The 4-(o-hydrocarbonylmercaptophenyl)-1-piperazine propanols produced by this method can be converted to the corresponding esters by acylation in the manner indicated hereinabove.

As indicated above, the piperazine alkanol compounds of the invention occur in both the free base and acid addition salt forms. In some instances it will be desirable to obtain the acid addition salt from the free base. The salt can be prepared by reacting the free base with the corresponding acid in the presence of a suitable organic solvent in which the resulting salt is insoluble, permitting isolation of the desired salt by filtration, decantation, etc. On the other hand in those instances where it is desired to convert the acid addition salt to the free base, the same can be accomplished by dissolving the acid salt in a suitable solvent such as water, methanol, etc., neutralizing the solution with a base such as sodium hydroxide, ammonium hydroxide, alkali metal carbonate and the like, and isolating the desired free base by extraction or other suitable means.

The 4-(o-hydrocarbonylmercaptophenyl)-1-piperazine alkanols and their acid salts possess pharmacological activity and are useful, when administered orally in suitable dosage form, in the prevention of nausea and vomiting and in the treatment of hypertension and anxiety states. The oral dosage is about 75 to 600 mg. per day. This dosage is conveniently administered in about 25 to 100 mg. quantities 3 to 6 times a day and the treatment continued as required to relieve the condition under treatment.

The invention is illustrated by the following examples.

*Example 1*

(a) A solution of 41.6 g. of 1-o-methylmercaptophenylpiperazine and 21 g. of 5-bromopentan-1-ol acetate ester in 200 ml. of toluene is stirred and refluxed for twelve hours. 100 ml. of the toluene is removed by distillation and the residual solution is cooled and diluted to 600 ml. with ether. The precipitated 1-o-methylmercaptophenylpiperazine hydrobromide is removed and the solvent is taken off under reduced pressure. The residual oil is divided into two equal portions and one portion is treated with one equivalent of isopropanolic hydrogen chloride. The resulting precipitate is collected and recrystallized from isopropanol. The product, 4-o-methylmercaptophenyl-1-piperazinepentanol acetate, monohydrochloride, has the formula

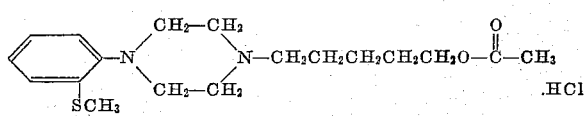

(b) The remaining portion of the residual oil is dissolved in 50 ml. of methanol. A solution of 3 g. of sodium hydroxide in 10 ml. of water is added and the resulting solution refluxed for six hours. The solvent is removed by distillation and 150 ml. of water is added to the residue. The residual mixture is extracted with ether and the ethereal solution is dried over anhydrous magnesium sulfate. The desiccant is removed by filtration or decantation and the ether is removed by distillation. The residual product, 4-o-methylmercaptophenyl-1-piperazinepentanol, has the formula

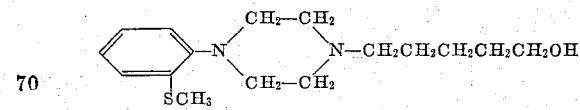

The residual product is converted to the monohydrochloride with one equivalent of isopropanolic hydrogen chloride. The hydrochloride is recrystallized twice from isopropanol to yield crystalline 4-o-methylmercaptophenyl-1-piperazinepentanol monohydrochloride; M. P. 187–8° C. This product has the formula

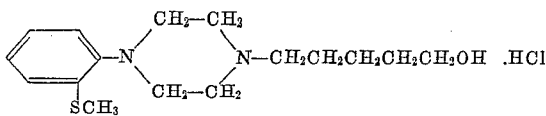

The starting materials employed can be prepared in the following manner.

*1 - o - methylmercaptophenylpiperazine.*—A solution of 139 g. of o-methylmercaptoaniline, 156 g. of bis(β-bromoethyl) amine hydrobromide and 400 ml. of dry butanol is stirred at reflux temperature for 18 hours. 53 grams of anhydrous sodium carbonate is added and the excess butanol and o-methylmercaptoaniline is removed by steam distillation. The remaining solution is made basic with aqueous sodium hydroxide and the solution is extracted with ether. The ethereal solution is dried and the ether is then removed by distillation. The residue is distilled in vacuo. The fraction which has a boiling point of 123–126° C. (0.2 mm. mercury) is 1-o-methylmercaptophenylpiperazine.

*5-bromopentan-1-ol acetate.*—2 grams of granulated zinc is added to 140 g. of acetyl bromide containing traces of hydrogen bromide and the mixture is stirred and warmed gently for 20 minutes. 86 grams of tetrahydropyran is added and the mixture is stirred at 60–70° C. for two hours, maintaining this temperature by cooling as necessary. The temperature is then increased to 90–100° C. and maintained for thirty minutes. The reaction mixture is distilled under reduced pressure to provide an almost quantitative yield of 5-bromopentan-1-ol acetate; B. P. 109–11° C. (14 mm. mercury).

*Example 2*

A solution of 22 g. of 1-o-ethylmercaptophenylpiperazine and 20 ml. of methyl acrylate in 100 ml. of ether is allowed to stand 16–18 hours at 23–25° C. The solvent and excess methyl acrylate are taken off under reduced pressure. The residue is dissolved in 100 ml. of anhydrous ether and added to a stirred slurry of 5 g. of lithium aluminum hydride in 700 ml. of ether. The reaction mixture is then stirred for thirty minutes and the complex decomposed by the cautious addition of an excess of aqueous sodium hydroxide. The ether layer is removed by decantation, dried over anhydrous magnesium sulfate and filtered. The ether is removed by distillation and the residue is triturated with low boiling petroleum ether until crystallization occurs. The product is removed by filtration and recrystallized from a mixture of ether and low boiling petroleum ether to provide 4-o-ethylmercaptophenyl-1-piperazine propanol; M. P. 68–70° C. This product has the formula

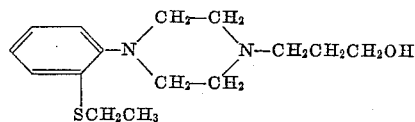

The starting material, 1-o-ethylmercaptophenylpiperazine, can be prepared from o-ethylmercaptoaniline which in turn can be prepared from 2-aminobenzenethiol, in the following manner.

*o-ethylmercaptoaniline.*—A solution of 375 g. of 2-aminobenzenethiol in 750 ml. of 95% ethanol is treated with a solution of 130 g. of sodium hydroxide in 350 ml. of water. The reaction mixture is cooled to 25° C. and 462 g. of diethyl sulfate is added over a period of one hour while maintaining the temperature at 20–30° C. by cooling. The reaction mixture is stirred for twenty minutes after the addition is completed. One liter of ether and one liter of dilute sodium hydroxide is added and the mixture is shaken well and allowed to separate. The ethereal solution is removed by decantation, washed twice with dilute sodium hydroxide, once with water, and then dried over anhydrous magnesium sulfate. The desiccant is removed and the ether is taken off. The residue is distilled to yield 400 g. of o-ethylmercaptoaniline; B. P. 97–99° C. (2.3 mm. mercury).

*1-o-ethylmercaptophenylpiperazine.*—A solution of 400 g. of o-ethylmercaptoaniline and 408 g. of bis-(β-bromoethyl)amine hydrobromide in 1.3 liters of butanol is stirred with refluxing for fifteen hours. 138 grams of sodium carbonate is added and the reaction mixture is steam distilled to remove all of the butanol. The remaining mixture is made strongly basic with aqueous sodium hydroxide and extracted with ether. The ethereal solution is washed twice with water and then extracted with 600 ml. of water containing 104 ml. of 37% hydrochloric acid. The aqueous layer is made basic with aqueous sodium hydroxide and extracted with ether. This ethereal solution is washed with dilute sodium hydroxide and dried over anhydrous magnesium sulfate. The magnesium sulfate is removed by filtration and the ether is distilled. The residue is distilled under reduced pressure to yield 172 g. of 1-o-ethylmercaptophenylpiperazine; B. P. 125–8° C. (0.3 mm. mercury).

*Example 3*

(a) A solution of 18 g. of 5-carbomethoxyvaleryl chloride in 150 ml. of benzene is added over a period of ten minutes to a stirred solution of 44 g. of 1-o-ethylmercaptophenylpiperazine in 600 ml. of benzene. The reaction mixture is stirred for ten minutes after the final addition and the precipitated 1-o-ethylmercaptophenylpiperazine monohydrochloride is removed by filtration. The filtrate is concentrated to about 125 ml. and then slowly added to a stirred slurry of 8 g. of lithium aluminum hydride in one liter of ether. The reaction mixture is stirred for thirty minutes, decomposed by the cautious addition of an excess aqueous sodium hydroxide, and the ether layer is removed. This ethereal solution is dried over anhydrous magnesium sulfate, filtered and the solvent is removed by distillation. The residual product, 4-o-ethylmercaptophenyl-1-piperazinehexanol, has the formula

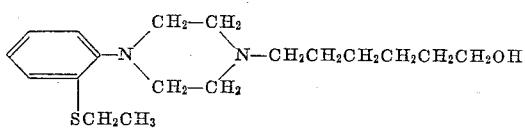

The residual product is converted to the monohydrochloride by the addition of one equivalent of isopropanolic hydrogen chloride. The mixture is diluted with ether and the precipitate is removed by filtration. This precipitate is recrystallized from a mixture of isopropanol and ether to provide 4-o-ethylmercaptophenyl-1-piperazinehexanol monohydrochloride; M. P. 130–133° C. This product has the formula

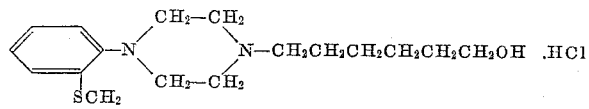

5-carbomethoxyvaleryl chloride, employed as a starting material, can be prepared in quantitative yield by refluxing a solution of 100 g. of monomethyl adipate and 120 g. of thionyl chloride in 250 ml. of carbon tetrachloride until the evolution of hydrogen chloride is complete (one and one-half to two hours), concentrating the reaction mixture to about 200 ml. and distilling the residue under reduced pressure. 5-carbomethoxyvaleryl chloride boils at 126–127° C. (24 mm. mercury).

(b) 4-o-ethylmercaptophenyl-1-piperazinehexanol can be converted to the corresponding acetate ester in the following manner: 5 g. of 4-o-ethylmercaptophenyl-1-piperazinehexanol is dissolved in a mixture of 10 ml. of glacial acetic acid and 1.6 ml. of acetic anhydride. The solution is stirred and warmed for one-half hour and is then treated with one equivalent of isopropanolic hydrogen chloride and diluted with ether. The product, which separates, is collected and recrystallized from isopropanol and ether to yield the hydrochloride salt of 4-o-ethylmercaptophenyl-1-piperazinehexanol acetate. This product which has the formula

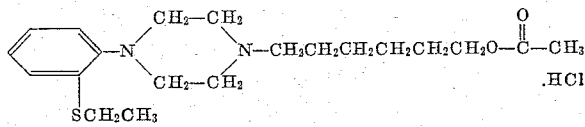

is converted to the corresponding free base, 4-o-ethylmercaptophenyl-1-piperazinehexanol acetate, by dissolving in water, neutralizing the solution with sodium bicarbonate and recovering the free base from the resulting mixture by extraction with ether.

*Example 4*

(a) A mixture of 44.6 g. of 1-o-ethylmercaptophenyl-piperazine, 21 g. of 5-bromopentanol-1 acetate ester and 300 ml. of benzene is stirred and refluxed for 18 hours. 200 ml. of benzene is removed by distillation and the residue is diluted to 600 ml. with anhydrous ether. The reaction mixture is chilled thoroughly to 0–5° C. and filtered. The filtrate is evaporated on a steam bath and the residue is divided into two equal portions. One portion is treated with one equivalent of isopropanolic hydrogen bromide, and the resulting precipitate is collected and recrystallized from isopropanol. The product, 4-o-ethylmercaptophenyl-1-piperazinepentanol acetate, hydrobromide, has the formula

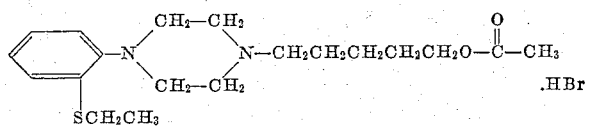

(b) The remaining portion of the residue of (a) is dissolved in 250 ml. of methanol and 1 g. of sodium methoxide is added. The solution is concentrated by evaporation on a steam bath, the residue is diluted to 500 ml. with ether and washed twice with water. The ethereal solution is dried over magnesium sulfate, filtered, and the ether removed from the filtrate by distillation. The residual product, 4-o-ethylmercaptophenyl-1-piperazinepentanol, has the formula

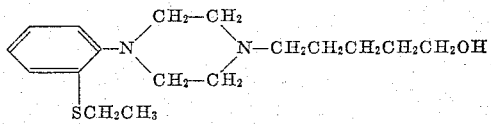

The residue is converted to the monohydrochloride by the addition of one equivalent of isopropanolic hydrogen chloride, diluted with ether and filtered. The filter cake is recrystallized from a mixture of isopropanol and ether to yield 4-o-ethylmercaptophenyl-1-piperazinepentanol monohydrochloride; M. P. 133–135° C. This product has the formula

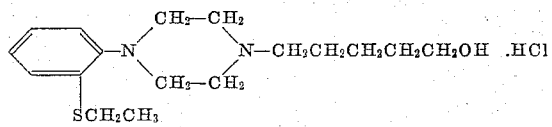

*Example 5*

A solution of 13.9 g. of 1-o-ethylmercaptophenyl-piperazine and 100 ml. of diethyl adipate is maintained at 100° C. for three hours. The ethanol which is liberated is removed under reduced pressure and the solution again is maintained at 100° C. for three hours. The reaction mixture is cooled and diluted with 800 ml. of dry ether and treated with an excess of dry hydrogen chloride. The organic solvents are decanted and the residual gum containing 4-o-ethylmercaptophenyl-1-delta-carbethoxyvalerylpiperazine hydrochloride is treated with an excess of cold dilute aqueous sodium bicarbonate and extracted with ether. The ether extract is dried over anhydrous magnesium sulfate and the desiccant is removed by filtration. The dry ethereal solution of 4-o-ethylmercaptophenyl-1-deta - carbethoxyvalerylpiperazine is slowly added to a stirred solution of 7 g. of lithium aluminum hydride in 500 ml. of dry ether. When the reaction is complete, an excess of aqueous alkali is added with caution and the ethereal layer is removed and dried over anhydrous potassium carbonate. After the desiccant has been removed by filtration, the filtrate is poured into isopropanol containing one equivalent of hydrogen chloride to form 4-o-ethylmercaptophenyl-1-piperazine-hexanol monohydrochloride which is isolated by filtration; M. P. 130–133° C. after recrystallization from a mixture of isopropanol and ether. This product has the formula

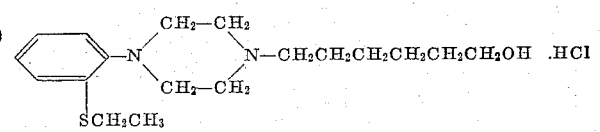

*Example 6*

A mixture of 41.6 g. of 1-o-methylmercaptophenyl-piperazine, 16.2 g. of delta-bromovaleronitrile and 200 ml. of toluene is refluxed for two hours. The reaction mixture is cooled, filtered, and the toluene is removed from the filtrate under reduced pressure. The residual oil containing 4-o-methylmercaptophenyl-1-piperazine-valeronitrile is dissolved in 350 ml. of absolute alcohol and the resulting solution is treated with anhydrous hydrogen chloride at 0–5° C. When the solution is complete, 1.8 ml. of water is added and the solution is slowly warmed to reflux with stirring and refluxing is continued for four hours. The reaction mixture is filtered while hot and the filtrate is evaporated to dryness under reduced pressure. The residue is dissolved in water, treated with an excess sodium bicarbonate and extracted with ether. The ether extracts are combined and dried over magnesium sulfate. After removing the desiccant, the solution of ethyl 4-o-methylmercaptophenyl-1-piperazinevalerate is slowly added with stirring to a solution of 4 g. of lithium aluminum hydride in 500 ml. of ether. When the reduction is complete, aqueous alkali is cautiously added to completely decompose the complex. The ethereal solution of 4-o-methylmercaptophenyl-1-piperazinepentanol is decanted and dried with anhydrous potassium carbonate. After filtering off the precipitate, the solvents are removed in vacuo from the filtrate. The residual product, 4-o-methylmercaptophenyl-1-piperazinepentanol, has the formula

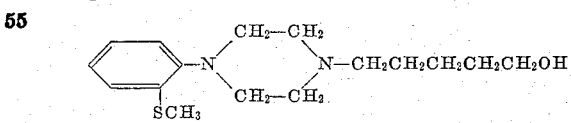

An alcoholic solution containing 2.9 g. of hydrogen bromide is added to a solution of 10 g. of 4-o-methyl-mercaptophenyl-1-piperazinepentanol in ether. The resulting precipitate is removed by filtration and recrystallized from isopropanol. The product obtained, 4-o-methylmercaptophenyl - 1 - piperazinepentanol hydrobromide, has the formula

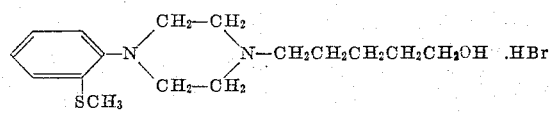

*Example 7*

A mixture of 41.6 g. of 1-o-methylmercaptophenyl-piperazine, 5 g. of metallic sodium and 130 ml. of allyl alcohol is refluxed with stirring for eighty hours. The reaction mixture is cooled, diluted with 250 ml. of water and substantially all of the allyl alcohol is removed by vacuum distillation. The residue is extracted with benzene, the benzene solution charcoaled with about 2 percent activated charcoal and filtered, and the solvents are removed from the filtrate by distillation under reduced pressure. The residual product, 4-o-methylmercaptophenyl-1-piperazinepropanol, has the formula

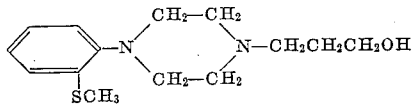

The sulfuric acid salt is obtained by dissolving the above free base in ethanol containing an equimolar quantity of sulfuric acid and recovering the precipitate formed, by filtration and recrystallization from isopropanol. This product has the formula

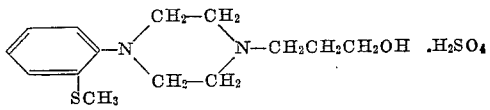

*Example 8*

A mixture of 42.4 g. of 1-o-ethylmercaptophenylpiperazine, 16.7 g. of pentamethylene bromohydrin and 250 ml. of benzene is refluxed for 24 hours with stirring. The reaction mixture is allowed to cool, 500 ml. of ether is added, the precipitate removed by filtration, and the solvents are removed from the filtrate by distillation under reduced pressure. The residual product, 4-o-ethylmercaptophenyl-1-piperazinepentanol, has the formula

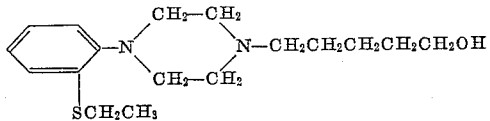

*Example 9*

(a) A mixture of 47 g. of 1-o-allylmercaptophenylpiperazine, 21 g. of 5-bromopentanol-1-ol acetate and 200 ml. of benzene is stirred and refluxed for twenty hours. 150 ml. of benzene is removed by distillation, and the residual mixture is cooled and diluted with 500 ml. of dry ether. The precipitate is removed by filtration, and the solvents are removed from the filtrate under reduced pressure. The residual oil is divided into two equal portions. One portion is dissolved in ether and treated with one equivalent of isopropanolic hydrogen chloride. The product is separated by filtration and recrystallized from isopropanol and ether to provide 4-o-allylmercaptophenyl-1-piperazinepentanol acetate, monohydrochloride, which has the formula

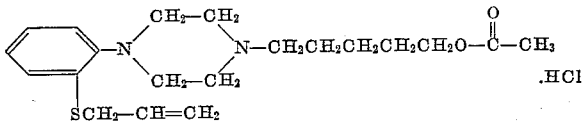

(b) The remaining portion of the residual oil obtained in (a) above is dissolved in 300 ml. of absolute methanol, 2 g. of sodium methoxide is added, and the solution is evaporated on a steam bath. The residue is diluted with 500 ml. ether, washed three times with water, and dried over anhydrous magnesium sulfate. The desiccant is filtered off and the filtrate is concentrated by evaporation on a steam bath. The residue is dissolved in ether and treated with one equivalent of isopropanolic hydrogen chloride. The product which separates is isolated and recrystallized from isopropanol and ether to provide 4-o-allylmercaptophenyl-1-piperazinepentanol, monohydrochloride, which has the formula,

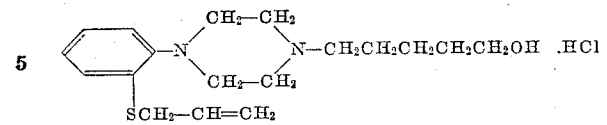

The starting material, 1-o-allylmercaptophenylpiperazine, can be prepared from o-allylmercaptoaniline which in turn can be prepared from 2-aminobenzenethiol, in the following manner.

*o-Allylmercaptoaniline.*—A hot solution of 125 g. of sodium hydroxide in 250 ml. of water is added to a solution of 375 g. of 2-aminobenzenethiol in 1.5 liters of absolute alcohol. The mixture is cooled to about 50° and 363 g. of allyl bromide is added over thirty minutes, maintaining the temperature at 50–70° C. during the addition. The mixture is stirred at 70° for an additional thirty minutes and is then diluted with 2 liters of cold water and 1.5 liters of ether. The ethereal solution is washed twice with water, once with dilute sodium hydroxide and is dried over anhydrous magnesium sulfate. After removal of the dessicant by filtration, the ether is removed from the filtrate by evaporation on a steam bath. The residual oil is distilled under reduced pressure to provide pure o-allylmercaptoaniline.

*1-o-allylmercaptophenylpiperazine.*—A solution of 330 g. of o-allylmercaptoaniline and 312 g. of bis-β-bromoethyl)amine hydrobromide in 2 liters of butanol is stirred and refluxed for sixteen hours. A solution of 150 g. of sodium hydroxide in 300 ml. of water is slowly added and the mixture steam-distilled to remove the butanol. The residue is cooled and extracted with ether and the ethereal solution is dried over solid sodium hydroxide. The ethereal solution is separated by decantation and distilled under reduced pressure to remove ether and excess o-allylmercaptoaniline. Continued distillation of the residue under reduced pressure provides pure 1-o-allylmercaptophenylpiperazine.

*Example 10*

(a) A mixture of 50 g. of 1-o-butylmercaptophenylpiperazine, 21 g. of 5-bromopentanol-1 acetate ester and 300 ml. of benzene is stirred and heated to reflux temperatures for 18 hours. 200 ml. of benzene is removed by distillation, the residue cooled and diluted to 600 ml. with dry ether. This mixture is cooled to 0–5° C. and filtered. The filtrate is evaporated on a steam bath and the residue is divided into two equal portions. One portion is treated with one equivalent of isopropanolic hydrogen bromide and diluted with ether and the resulting precipitate is collected and recrystallized from isopropanol. The product 4-o-butylmercaptophenyl-1-piperazinepentanol acetate, hydrobromide, has the formula

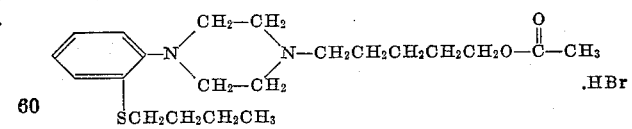

(b) The remaining portion of the residue of (a) is taken up in 250 ml. of methanol and 1 g. of sodium methoxide is added. The solvent is taken off by evaporation on a steam bath and the residue is diluted to 500 ml. with ether and washed twice with water. This ethereal solution is dried over anhydrous magnesium sulfate, filtered and the ether removed from the filtrate by distillation. The residual product, 4-o-butylmercaptophenyl-1-piperazinepentanol, having the formula

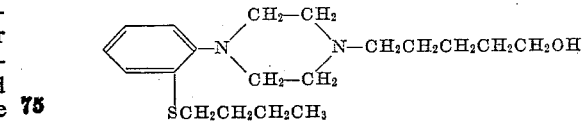

is converted to the monohydrochloride by the addition of one equivalent of isopropanolic hydrogen chloride, and the mixture is diluted with ether and filtered. The filter cake is recrystallized from a mixture of isopropanol and ether to yield 4-o-butylmercaptophenyl-1-piperazinepentanol monohydrochloride; M. P. 133–135° C. This product has the formula

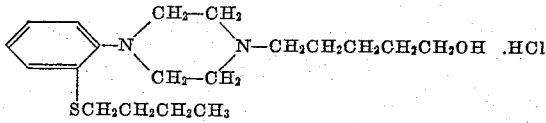

The starting material, 1-o-butylmercaptophenylpiperazine, can be prepared from o-butylmercaptoaniline which in turn can be prepared from 2-aminobenzenethiol in the following manner.

*o-Butylmercaptoaniline.*—325 grams of 2-aminobenzenethiol and 1.2 liters of absolute ethanol is treated with a hot solution of 110 g. of sodium hydroxide and 150 ml. of water. 327 grams of butylbromide is then added to the hot solution at such a rate that gentle refluxing is maintained, the addition requiring about 20–30 minutes. The reaction mixture is refluxed for an additional 45 minutes. 800 ml. of alcohol is removed by distillation and the residue solution cooled and 1200 ml. of ice water is added. The mixture is extracted with ether and the ethereal extract is washed twice with dilute aqueous sodium hydroxide, once with water and finally dried over anhydrous magnesium sulfate. The magnesium sulfate is removed and the filtrate is distilled on a steam bath. The resdue is distilled under reduced pressure to obtain 412 g. of o-butylmercaptoaniline; B. P. 104–6° C./1 mm.

*1-o-butylmercaptophenylpiperazine.*—A mixture of 412 g. of o-butylmercaptoaniline, 353 g. of bis(β-bromoethyl)amine hydrobromide and two liters of butanol is stirred and heated to reflux temperatures for 16 hours. 120 grams of sodium carbonate is then added and the reaction mixture is steam-distilled to remove all of the butanol. The remaining mixture is made strongly basic with aqueous sodium hydroxide and then extracted with ether. The ethereal extract is washed three times with water and then extracted with 800 ml. of water containing 92 ml. of 37% hydrochloric acid. The aqueous layer is made strongly basic with aqueous sodium hydroxide and extracted with ether. The ethereal solution is dried, filtered and the ether is taken off by distillation under reduced pressure. 1-o-butylmercaptophenylpiperazine is obtained in the fraction boiling at 134–136° C. at 0.25 mercury pressure.

Example 11

A mixture of 44.4 g. of 1-o-ethylmercaptophenylpiperazine, 19.5 g. of ethyl γ-bromobutyrate and 200 ml. of benzene is stirred at reflux temperature for 12 hours. The reaction mixture is cooled, filtered, and the solvent is removed from the filtrate by distillation. The residue is dissolved in anhydrous ether and added with stirring to 4 g. of lithium aluminum hydride dissolved in 500 ml. of anhydrous ether. When reduction is complete, an excess of aqueous alkali is added and the ethereal solution is decanted and dried over anhydrous potassium carbonate. The mixture is filtered and the ether is removed from the filtrate by evaporation on a water bath. The residual product, 4-o-ethylmercaptophenyl-1-piperazinebutanol, has the formula

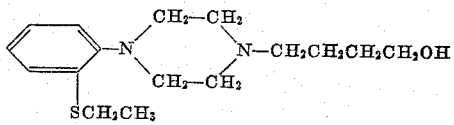

The free base is converted to the monohydrochloride by the addition of one equivalent of isopropanolic hydrogen chloride. The product, 4-o-ethylmercaptophenyl-1-piperazinebutanol monohydrochloride is isolated by filtration. The product has the formula

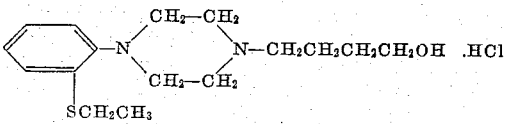

I claim:
1. A compound of the class consisting of a free base and its acid addition salts, said free base having the formula

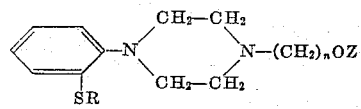

where R is a member of the class consisting of an allyl group and alkyl groups containing not more than four carbon atoms, Z is a member of the class consisting of hydrogen and lower aliphatic carboxylic acid acyl groups and $n$ is an integer from 3 to 6 inclusive.

2. A compound having the formula,

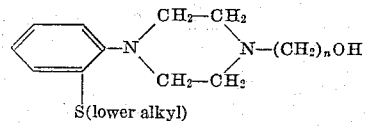

where $n$ is an integer from 3 to 6 inclusive.

3. 4-o-(lower alkyl) mercaptophenyl-1-piperazinepentanol.
4. 4-o-methylmercaptophenyl-1-piperazinepentanol.
5. 4-o-ethylmercaptophenyl-1-piperazinepentanol.
6. 4-o-allylmercaptophenyl-1-piperazinepentanol.
7. 4-o-ethylmercaptophenyl-1-piperazinehexanol.
8. An acid addition salt of 4-o-ethylmercaptophenyl-1-piperazinepentanol.
9. Process for the production of 4-(o-hydrocarbonylmercaptophenyl)-1-piperazine alkanols having the formula

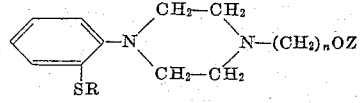

which comprises reacting an N-phenylpiperazine having the formula

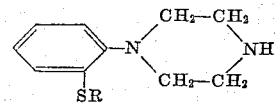

with an ω-haloalkanol having the formula

where Hal is a halogen atom, Z is a member of the class consisting of hydrogen and lower aliphatic carboxylic acid acyl groups. R is a member of the class consisting of an allyl group and alkyl groups containing not more than four carbon atoms and $n$ is an integer from 3 to 6 inclusive.

No references cited.